June 9, 1942. L. M. KELLS ET AL 2,285,722
SLIDE RULE
Filed April 7, 1938 2 Sheets-Sheet 1

INVENTORS
LYMAN M. KELLS
WILLIS F. KERN
JAMES R. BLAND
BY
Orton and Griswold
ATTORNEYS June 9, 1942. L. M. KELLS ET AL 2,285,722
SLIDE RULE
Filed April 7, 1938 2 Sheets-Sheet 2

INVENTORS
LYMAN M. KELLS
WILLIS F. KERN
JAMES R. BLAND
BY
ATTORNEYS

Patented June 9, 1942

2,285,722

UNITED STATES PATENT OFFICE 2,285,722

SLIDE RULE

Lyman M. Kells, Willis F. Kern, and James R. Bland, Annapolis, Md., assignors to Keuffel & Esser Company, Hoboken, N. J., a corporation of New Jersey Application April 7, 1938, Serial No. 200,578

20 Claims. (Cl. 235—70)

This invention relates to slide rules of the kind in which indices in the form of scales adapted to coact with one another in accordance with well known laws are arranged on the respective relatively movable component elements.

Three types of slide rules are in general use. In one type, relatively movable elements reciprocate with respect to one another and on the respective elements are parallel coacting scales. Such slide rules comprise a body member composed of spaced parallel side bars between which reciprocates, as by means of a tongue and groove connection, a slide, the scales appearing on one or both surfaces of the rule. Another type of slide rule involves concentric rotatable discs of progressively varying diameter around the peripheries of which are arranged the coacting scales. So-called cylindrical slide rules consist, usually, in an axially rotatable cylinder on the surface of which are scales extending in the longitudinal direction of the rule while a rotary and usually axially movable slide concentric therewith carries parallel coacting scales. In all these rules the indices or scales are arranged in logarithmic proportions, the arrangement being based upon the principle that the sum of the logarithms of numbers is equal to the logarithm of the product of those numbers. To make computations in multiplication, for instance, it has been the practice to bring the index of one logarithmic scale to the scale division representing the logarithm of one of the numbers to be multiplied on a coacting scale and then read the product at the scale division representing the log of that product opposite the scale division on the moved scale representing that number by which it is multiplied. Division is performed as a reverse of this manipulation.

Simple computations have been thus readily effected by movement of the slide with respect to the body and, as the art has progressed, additional coacting scales have been added to slide rules enabling the solution of problems in square and cube root, in trigonometry and in the figuring of fractional powers and roots. A slide rule has been devised by which the right triangle has been solved by a single setting of the slide but in the solution of other problems a sequence of steps has been necessary, each step necessitating the proper relation of slide and body and the making of a notation of the results found after each step in order that the parts may be again manipulated in the performance of a further step using the result found in the previous computations. Each individual problem further required a different method of manipulating a rule so that great difficulty was experienced by all users in determining the proper manipulation to be used in solving problems with which they had not had recent and extensive practice. No slide rule heretofore proposed has ever overcome this difficulty.

In copending application Serial No. 137,400 filed April 17, 1937, Patent Number 2,170,144 dated August 22, 1939, there is provided a slide rule, irrespective of type, by which, with the application of not more than two easily understood and readily memorized principles, the user is able to devise the best settings for any particular purpose and to recall settings which have been forgotten. In this slide rule problems involving numerical and trigonometrical terms may be solved, irrespective of the number of steps therein, in a continuous manipulation, that is, without the necessity of having to set down a result in order to retain the same while a new setting is made.

In copending application Serial No. 160,016 filed August 20, 1937, Carl M. Bernegan Patent Number 2,168,056 dated August 1, 1939, it is proposed to facilitate the reading of the trigonometric scales by the provision, on one of two relatively movable members of the slide rule of a scale which is graduated in scale graduations to give readings of angles of the trigonometric functions which are found by reference to a logarithmic scale of the same unit length or modulus on the other member, the indicia of the first named scale graduations being slanted in the direction in which the angle increases. In respect of the tangent scale, indicia are provided which slant in the direction in which the angle increases while other indicia slant in the opposite direction to indicate the continuation of such scale. Also, if desired, the color of one series of the indicia may contrast with the color of another series of indicia.

The object of the present invention is to facilitate the selection, in the slide rule manipulation, of the related scales in solving problems involving trigonometric functions. Accordingly, the indicia associated with the scale representing one series of trigonometric functions is colored with the same color as the related trigonometric scale, while the indicia associated with the scale representing a different series of trigonometric functions and the related trigonometric scale are both colored with a color which contrasts with the first named related scales.

Another object of the present invention is to facilitate the differentiations of direct functions from cofunctions on the trigonometric scales. In carrying this aspect of the invention into effect the scales representing direct functions are colored with the same color as the logarithmic scales on which they are read while the co-functions are read on scales of a different or opposite color.

The invention also seeks to facilitate the solution of problems on a slide rule by the simplest manipulations.

The invention also seeks a coloration of respective related scales which is practical from the standpoint of visibility, durability and distinctiveness in use and practicability in manufacture.

These and other objects of the invention and the means for their attainment will be more apparent from the following detailed description, taken in connection with the accompanying drawings illustrating one embodiment by which the invention may be realized and in which.

Figure 1:
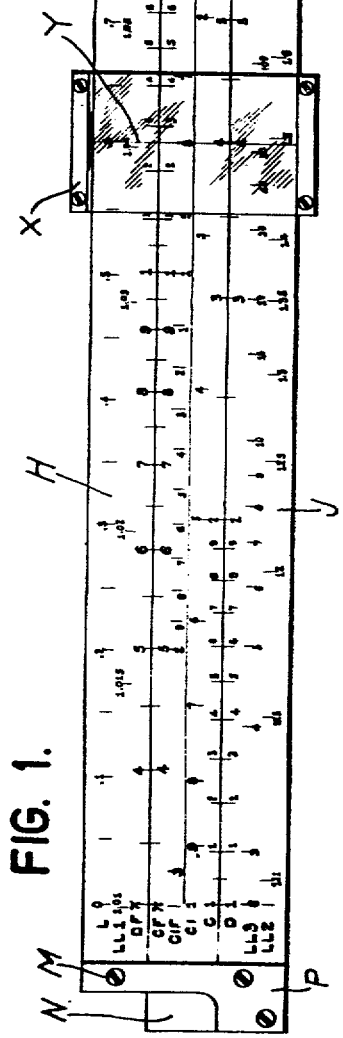
Figure 1 is a plan view showing one face of the slide rule of this invention.

In the drawings, side bars H and J are rigidly secured together by means of plates P which are secured thereto at M, so that a sliding bar N may be mounted between said bars H and J so as to be readily slidable longitudinally thereof. The slidable bar N has the usual tongue members on each edge adapted ot slide in the usual groove members on the edges of the bars H and J contiguous to the sliding bar N so that the sliding bar N is always held in engagement between the bars H and J in whatever position it occupies longitudinally thereof. A runner or indicator X, transparent on both faces and of any usual construction, is mounted over said bars H, J and N so as to be readily moved into any position desired between the plates P, and the runner X has a hairline Y on each side thereof.

On the front side of the rule, as shown in Figure 1, the upper scale on the bar H is designated as L and is a scale of equal parts from 0 to 1.0 and is used to obtain common logarithms when referred, as will be understood, to the D scale on bar J, referred to hereinafter. The scale next below the L scale on this face is designated as LLI and has graduations representing logarithms of the logarithms of the numbers 1.01 to 1.11. The scale below the LLI scale is designed as DF, and is a standard logarithmic scale of full unit length the same as the D scale which is yet to be described, except that it is folded and has its index at the center. This scale is proximate the inner edge of the upper side bar.

The front face, as viewed, of the slide is provided along its upper edge with a scale designated as CF and is identical with the DF scale, on the upper side bar H.

Also on the front face of the slide below the CF scale is a scale designated as CIF, which is a standard folded reciprocal logarithmic scale of full unit length graduated from 10 to 1 similar in every respect to the D scale soon to be described except that it is folded and inverted. Immediately below the CIF scale is the scale designed as CI which is a standard reciprocal logarithmic scale of full unit length graduated from 10 to 1. Below the CI scale and proximate the lower edge of the slide N is a fourth scale designated as C and has standard graduated logarithmic divisions of full unit length from 1 to 10. This scale is the same as the D scale on the body, (bar J) next to be described.

On the upper edge of the side bar J proximate the slide is a scale designated as D, which is the same as the C scale and is a standard logarithmic scale of full unit length. Along the lower edge of the side bar J is a scale designated as LL2 which has graduations representing the logarithms of logarithms of the numbers from 1.11 to 2.7. The midde scale on the front face of the lower side bar is a scale, designated as LL3, which has graduations representing the logarithms of logarithms of the numbers from 2.7 to 22,000. These three scales LL1, LL2 and LL3 are, conveniently, continuations of each other, as will be clear from the foregoing.

Figure 2:
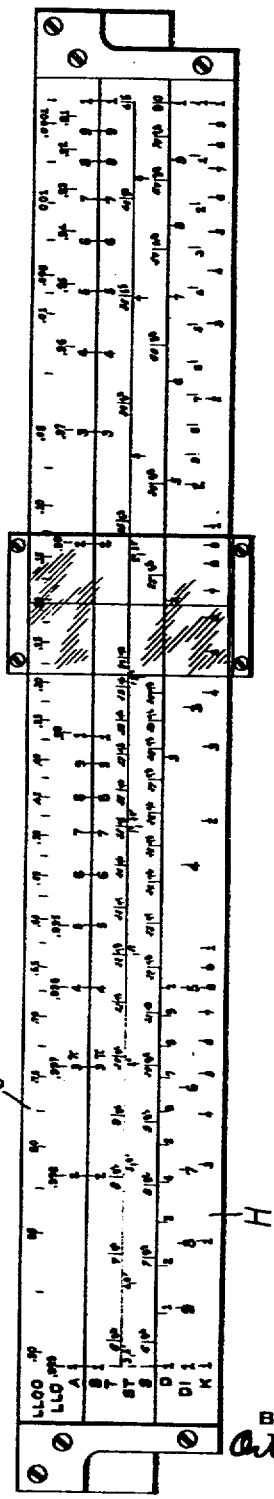
Figure 2 is a similar view showing the reverse face.
Figure 4:
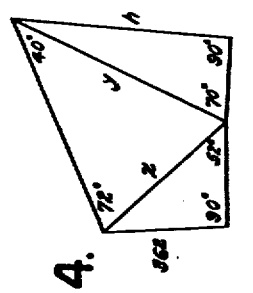
Figure 4 shows a rectilinear figure, problems in respect of which may be similarly solved.
Figure 3:
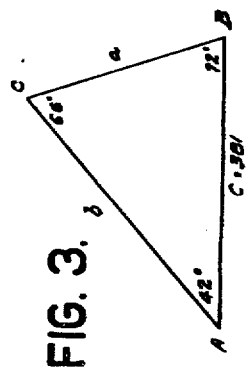
Figure 3 shows a triangle illustrative of the solution of various problems by the rule of this invention.

On the rear face of the slide rule, as shown in Figure 2, is a scale designated LL00 along the upper edge of the upper (as viewed) side bar J and immediately below that scale LL00 is a scale designated as LL0, both these scales together representing the logarithms of co-logarithms between 0.00005 and 0.999. These scales are used to find powers and roots of numbers below unity and to find co-logarithms to any base numbers below unity. The lower scale on the upper side bar J, on the rear face, is designated A and comprises a standard graduated logarithmic scale of two unit lengths. The A scale represents the natural co-logarithms of the numbers on the LL0 and LL00 scales.

Figure 5:
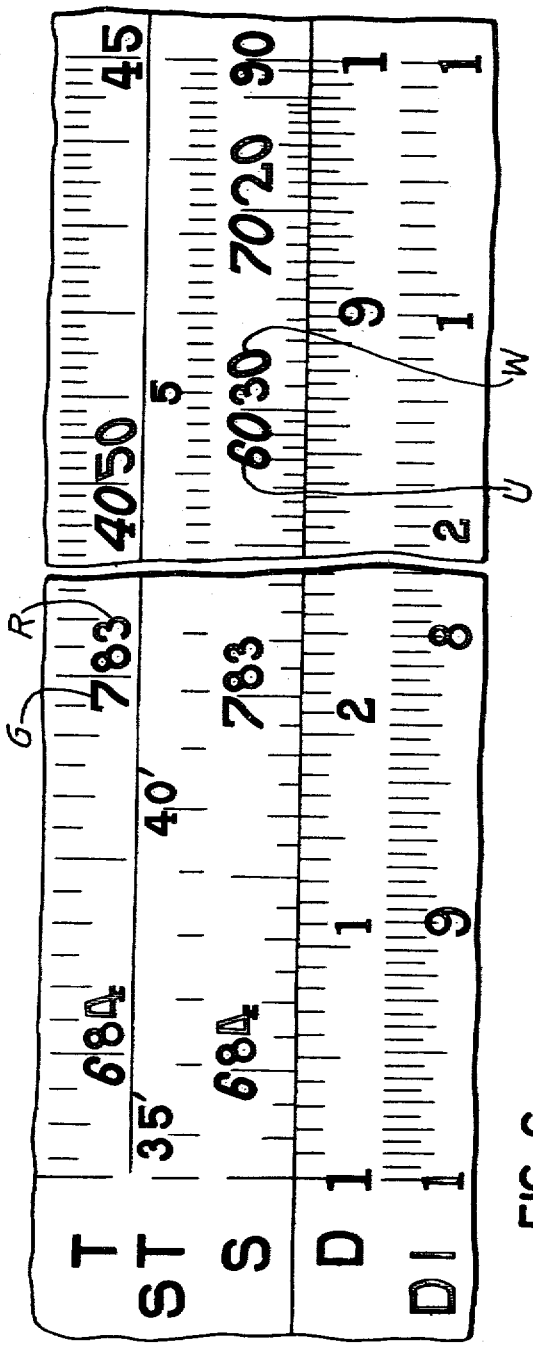
Figure 5 is a fragmentary view on an enlarged scale showing pertinent portions of the face of the slide rule of Figure 2.
Figure 6:
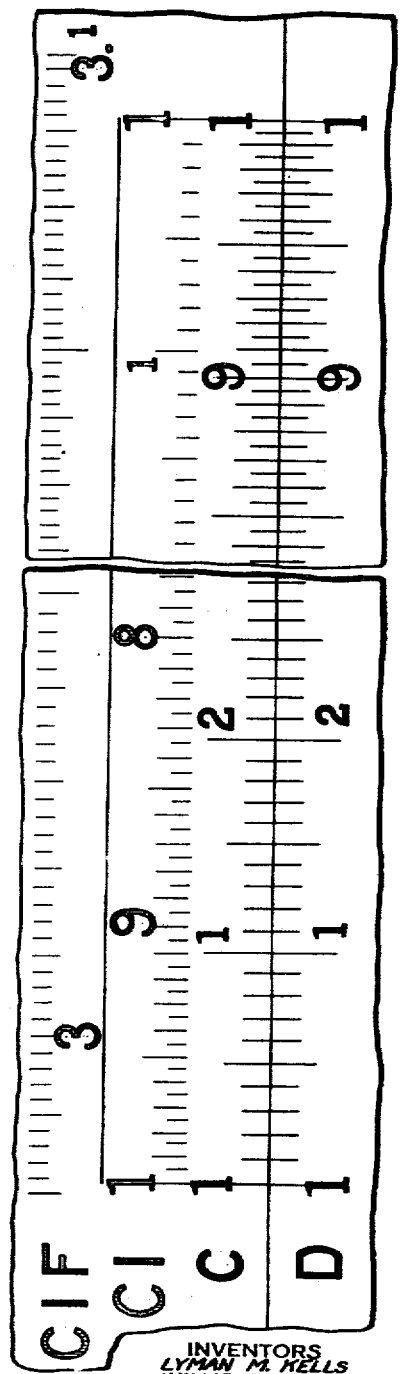
Figure 6 is a fragmentary view on an enlarged scale showing pertinent portions of the face of the slide rule of Figure 1.

On the slide N, on this rear face of the rule, and along the upper edge thereof, is a scale designated as B which has the same graduations as the scale A. Immediately below the B scale on the slide is a scale designated as T which is a tangent scale with divisions to represent angles from 5°45' to 45°. This range of angles will give tangents in connection with the C or D scale and cotangents in connection with the CI or DI scale. As shown in Figure 5, the numerals G representing the angles below 45° are indicated in one color, say, black, and slanted in the direction in which the scale is read, while the numerals R indicating the continuation of this scale (45° to 84°15') in the opposite direction are in a different color, say, red, and slant in the opposite direction, i. e., the direction in which the angle increases and in which this scale is read. The angles noted in red will give tangents in connection with CI or DI scales and cotangents in connection with the C or D scales.

Immediately below the tangent scale T is a scale designated as ST. This scale is used whenever an angle less than 5°44', that is, an angle whose sine or tangent is less than 0.1, is involved in the solution of a trigonometrical problem. The lowermost scale on the slide N, on the rear face thereof, is the scale designated as S and is a scale graduated to the angles in degrees and minutes from 5°40' to 90° and is used with reference to the scales C or D from which scales are then read the sines of the angles indicated on the S scale. This scale obviously also enables a reading for the cosine to be obtained on the C or D scales when reading, however, in the opposite direction. The numerals U used in obtaining the sine are, therefore, in one color, say, black, and slant in the direction in which the angle increases, while the numerals W used in obtaining the cosine are in a different and contrasting color, say, red, and slant in an opposite direction, i. e., in the direction in which the angle increases and in which this scale is read.

On the lower side bar on the rear face, (here the bar H) and along the edge proximate the slide N, is another scale designated as D which is exactly the same as the D scale on the front face hereinbefore described. Below the D scale is a scale designated as DI and is a standard reciprocal logarithmic scale of full unit length graduated from 10 to 1 the same as the D scale except that it is inverted. The lowermost scale on this face is a scale designated as K. This scale is graduated to show the cube of a number in the same transverse line on the D scale and comprises the standard graduated logarithmic scale of three unit lengths. Conversely, of course, the D scale shows the cube root of the corresponding graduation on the K scale.

The numbers on the sine scales S and ST represent angles. The ST scale is a sine scale, but since it is also used as a tangent scale, it is designated ST. When the indicator is set to a number (an angle) on the scale S, when reading from the left as viewed, or on the ST scale, the sine of the angle is read on the scale C, at the hairline Y and hence also on the scale D when the indices on scales C and D coincide. Also when the indicator is set to a number (an angle) on scale T, when reading from the left, the tangent of the angle is read on the scale C at the hairline and hence on the scale D when the indices of scales C and D coincide. All of the scales just discussed, to wit: scales, C, D, ST, and S and T, both reading from the left, are colored, both letters and numerals, with the same color, in this instance, black. For example, to find the sine of the angle of 30° we set the hairline on the graduation indicated by the black numeral and read on the black scales C or D. Again to find the tangent of 36°, set the hairline at 36 on the black T scale and on the black scale C read 0.727 under the hairline. To find cot 27°10' push the hairline to 27°10' on black T scale and at the hairline read 1.949 on the red CI scale.

It is to be observed that the red numbers (the shaded numbers) R and W on the S and T scales express the complements of the angles represented by the corresponding black numbers on these scales. To illustrate, when the hairline is set to an angle $\theta$ on scale S red, cos $\theta$=sin (90°−$\theta$) is on scale C at the hairline and hence on scale D when the rule is closed. Also when the hairline is set to an angle $\theta$ on scale S red, $$\sec \theta = \frac{1}{\cos \theta}$$

is on scale CI at the hairline. Thus to find cos 60°, push the hairline to 60° on S red, read at the hairline 0.5 on C. To find sec 60°, push the hairline to 60° on S red, at the hairline read 2 on CI red.

When the hairline is set to an angle $\theta$ on scale T red, cot $\theta$=tan (90°−$\theta$) is on scale C at the hairline. Also when the hairline is set to an angle $\theta$ on scale T red, $$\tan \theta = \frac{1}{\tan (90° - \theta)}$$

is on scale CI at the hairline. Thus to find cot 54°, push the hairline to 54° on T red, read at the hairline 0.727 on C. To find tan 62°50', push the hairline to 62°50' on T red, at the hairline read 1.949 on CI red.

Thus, if the hairline be set to an angle on a trigonometric scale, it is automatically set to the complement of this angle. One of these angles is expressed in black type, the other in red. From what has been said it appears that one may read at the hairline on the C scale or on the CI scale, a figure expressing a direct function, (sine, tangent, secant) by reading a figure of the same color as that representing the angle and a co-function (cosine, cosecant, cotangent) by reading a figure of the unlike color. Accordingly it may be observed that: Direct functions (sin, tan, sec) are read on like colors (black to black, or red to red) co-functions (cos, cot, csc) are read on unlike colors (black to red, or red to black).

The following examples illustrate in concise form the application of the color relationship between the trigonometrical and the logarithmical scales.

DIRECT FUNCTIONS; SINE, TANGENT AND SECANT;
LIKE COLORS

*Example 1*

$x$=sin 14°15' (direct function)
Opposite 14°15' (black numbers) on S scale
Read $x$=.246 on C or D scale (black numbers).

*Example 2*

$x$=sin 1°30' (direct function)
Opposite 1°30' (black numbers) on ST scale
Read $x$=.0262 on C or D scale (black numbers).

*Example 3*

$x$=tan 14°15' (direct function)
Opposite 14°15' (black numbers) on T scale
Read $x$=.254 on C or D scale (black numbers).

*Example 4*

$x$=tan 60°30' (direct function)
Opposite 60°30' (red numbers) on T scale
Read $x$=1.767 on CI or DI scale (red numbers).

*Example 5*

$x$=sec 60°30' (direct function)
Opposite 60°30' (red numbers) on S scale
Read $x$=2.03 on CI or DI scale (red numbers).

COFUNCTIONS; COSINE, COTANGENT AND COSECANT;
UNLIKE COLORS

*Example 6*

$x$=cos 60°30' (co-function)
Opposite 60°30' (red numbers) on S scale
Read $x$=.492 on C or D scale (black numbers).

*Example 7*

$x$=cot 14°15' (co-function)
Opposite 14°15' (black numbers) on T scale
Read $x$=3.94 on CI or DI scale (red numbers).

*Example 8*

$x$=cot 60°30' (co-function)
Opposite 60°30' (red numbers) on T scale
Read $x$=.566 on C or D scale (black numbers).

Example 9

$x = \csc 14°15'$ (co-function)
Opposite 14°15' (black numbers) on S scale
Read $x = 4.06$ on CI or DI scale (red numbers).

Example 10

$x = \csc 1°30'$ (co-function)
Opposite 1°30' (black numbers) on ST scale
Read $x = 38.2$ on CI or DI scale (red numbers).

These simple examples will serve as an introduction to examples illustrating the part which the related colors of scale graduations play in the solution of problems simplified into proportions involving trigonometric functions which are performed by combined operations in progressive manipulations.

In working problems of combined operations, the first consideration should be to determine, in the problem, on what color trigonometric scale the angle is to be taken and on what color logarithmic scale the particular function would be read if the natural value of this function were desired. One way of noting this in the problem is as follows:

Example 11

$$\frac{\cos 79°05' \quad .0486 \sec 70°10'}{\sin 55°}$$

$$\frac{\overset{(R\ to\ B)}{\cos 79°05'} \quad \overset{(R\ to\ R)}{.0486 \sec 70°10'}}{\underset{(B\ to\ B)}{\sin 55°}}$$

The note "(R to B)" indicates that cos 79°05' is read from a red trigonometric scale to a black logarithmic scale. The note "(R to R)" means that sec 70°10' is read from a red trigonometric scale to a red logarithmic scale. The note "(B to B)" means that sin 55° is read from a black trigonometric scale to a black logarithmic scale.

Now if any of the functions are to be read on a red logarithmic scale (like sec 70°10' in the above example) then these particular functions should be handled in reverse, i. e., if such function appears in the numerator of the problem it will be treated like a factor of the denominator and vice versa.

Therefore in the above example:
To .0486 on D scale
Draw 55° on S scale
Push hairline to 79°05' on S (red) scale
Draw 70°10' on S (red) scale to hairline and
Read at the index .03319 on D (black) scale.

Example 12

$$x = \frac{\overset{(B\ to\ B)}{4 \sin 38°}}{\underset{(B\ to\ B)}{\tan 42°}}$$

Both functions appear on the C scale or the D scale (black).
Therefore:
To 4 (black) on D scale
Draw 42° (black) on T scale
At 38° (black) on S scale
Read $x = 2.735$ on D (black) scale.

Example 13

$$x = \frac{\overset{(R\ to\ R)}{4 \tan 65°}}{\underset{(B\ to\ R)}{\cot 42°}}$$

Since both functions appear on the CI scale or the DI scale, which are red, these functions are treated as if in reverse.
Therefore:
To 4 on D scale
Draw 65° on T scale
At 42° on T scale
Read $x = 7.72$ on D scale.

Example 14

$$x = 4 \overset{(B\ to\ B)}{\sin 38°} \quad \overset{(R\ to\ R)}{\tan 65°}$$

Since sin 38° is read on C or D scale (black), tan 65° is read on CI or DI (red). Therefore the last function is treated as if in reverse.
Therefore:
To 4 on D scale
Draw 65° on T scale
At 38° (black) on S scale
Read $x = 5.28$ on D scale.

Example 15

$$x = 4 \overset{(R\ to\ R)}{\sec 38°} \quad \overset{(R\ to\ B)}{\cos 30°}$$

Since sec 38° appears on CI or DI scale (red) it is treated as if in reverse and cos 30° appears on C scale or D scale (black).
Therefore:
To 4 on D scale
Draw 38° (red) on S scale
At 30° (red) on S scale
Read $x = 4.4$ on D scale.

Example 16

$$x = \frac{\overset{(B\ to\ R)}{4 \csc 20°}}{\underset{(B\ to\ R)}{\cot 35°}}$$

Since both these functions appear on CI or DI scale (red) both are treated as if in reverse.
Therefore:
To 4 on D scale
Draw 20° (black) on S scale
At 35 on T scale
Read $x = 7.6$ on D scale.

Example 17

$$x = \frac{15.8 \csc 17° \cot 31° \cos 41°}{18 \tan 48° \sqrt{15.2}}$$

Since csc 17° and cot 31° and tan 48° appear on the CI or DI scale (red) they are treated as if in reverse, thus:

$$x = \frac{\overset{(B\ to\ R)}{15.8 \csc 17°} \quad \overset{(B\ to\ R)}{1/18 \cot 31°} \overset{(R\ to\ B)}{\cos 41°}}{\underset{(R\ to\ R)}{\tan 48° \sqrt{15.2}}}$$

Therefore:
To 15.8 on D scale
Draw 17° (black) on S scale
Push indicator to 18 on CI scale
Draw 31° on T scale under indicator
Push indicator to 48° on T scale
Draw 15.2 on B scale (right) under indicator
Push indicator to 41° (red) on S scale
And read 0.870 on D scale.

It will thus be seen that a slide rule has been provided in which one of the members is graduated in scale graduations to give readings of angles, the trigonometric functions of which are found by reference to a logarithmic scale, the indicia of the scale graduations being so colored that direct functions are read on like colors (black to black, or red to red) while co-functions are read on opposite colors (black to red, or red to black), thereby to facilitate the visual selection of the desired scale graduations and simplify the manipulation of the slide rule in solving problems involving trigonometric values.

Various modifications will occur to those skilled in the art in the type of slide rule employing this invention as well as in the selection and/or disposition of the colors and no limitation is intended by the phraseology of the foregoing specification or illustrations in the accompanying drawings except as indicated by the appended claims.

What is claimed is:

1. A slide rule comprising a relatively movable slide and body, said slide and body being graduated in identical logarithmic scales of the same modulus, said slide being also graduated in scale graduations to give readings of angles the values of the trigonometric functions of which can be found by reference to at least one of said logarithmic scales when the indices thereof are aligned, the indicia of the logarithmic scale graduations giving readings of the values of the direct functions of the angles having the same distinguishing characteristic as the indicia of the respective related scale graduations giving the readings of the respective angles and the indicia of the logarithmic scale graduations giving readings of the values of the co-functions of the angles having a different distinguishing characteristic from the distinguishing characteristic of the indicia of the respective related scale graduations giving the readings of the respective angles, whereby the related scales determining the value of any trigonometric function are indicated.

2. A slide rule comprising a relatively movable slide and body, said slide and body being graduated in identical logarithmic scales of the same unit length, said slide being also graduated in scale graduations to give readings of angles the values of the trigonometric functions of which can be found by reference to related logarithmic scales on the slide, said slide being graduated in logarithmic scales of the same unit length, the indicia of the scale logarithmic graduations giving readings of the values of the co-functions of the angles having a different distinguishing characteristic from the distinguishing characteristic of the indicia of the respective related scale graduations giving the readings of the respective angles, whereby the treatment of any trigonometric function in a problem involving proportions performed by combined operations in progressive manipulations is indicated by the color relationship.

3. A slide rule comprising a relatively movable slide and body, said slide and body being graduated in identical logarithmic scales of the same modulus, said slide rule being also graduated in at least one reciprocal logarithmic scale, said slide being graduated in scale graduations of the same modulus as the logarithmic scales to give readings of angles the values of the trigonometric functions of which can be found by reference to the logarithmic scale on the slide when the indices thereof are aligned, the indicia of the scale graduations giving readings of the values of the direct functions of the angles being of the same color as the indicia of the respective scale graduations giving the readings of the respective angles and the indicia of the scale graduations giving readings of the values of the co-functions of the same angles being of a different color from the color of the indicia giving readings of direct functions of said angles and also of a color different from the indicia of the respective scale graduations giving the readings of the respective angles whereby the treatment of any trigonometric function in a problem involving proportions performed by combined operations in progressive manipulation is indicated by the color relationship.

4. A slide rule comprising a relatively movable slide and body, said slide and body being respectively graduated in identical logarithmic scales of the same modulus, said slide being graduated in scale graduations of the same modulus as the logarithmic scales to give readings of angles the values of the trigonometric functions of which can be found by reference to said logarithmic scale graduations on the slide when the indices thereof are aligned, said slide being graduated in logarithmic scales of the same modulus, the indicia of the scale graduations giving readings of the values of the co-functions of angles being of a different color from the color of the indicia of the respective scale graduations giving the readings of the respective angles whereby the treatment of any trigonometric co-functions in a problem involving proportions performed by combined operations in progressive manipulations is indicated by the color relationship.

5. A slide rule comprising a relatively movable slide and body, said slide and body being graduated in identical logarithmic scales of the same modulus, an inverted logarithmic scale on the slide, said slide being graduated in scale graduations of the same modulus to give readings of angles up to forty-five degrees, the values of the tangential functions of which can be found by reference to the logarithmic scale on the slide when the indices thereof are aligned, said slide being also graduated in scale graduations of the same modulus as the aforesaid scales to give readings of angles above forty-five degrees, the values of the tangential functions of which can be found by reference to the inverted logarithmic scale on the slide when the indices thereof are aligned the indicia of the scale giving readings of angles up to forty-five degrees and the indicia of the logarithmic scale on the slide giving readings of the values of the tangents of angles up to forty-five degrees being of like colors and the indicia of the scale giving readings of angles above forty-five degrees and the indicia of the related logarithmic scale on the slide giving readings of the values of the tangents of angles above forty-five degrees being of like colors but of a color different from the color of the indicia of the scale giving readings of angles, whereby the treatment of a tangent function of angles up to forty-five degrees in a problem involving proportions performed by progressive manipulations is indicated by the color relationship.

6. A slide rule comprising a relatively movable slide and body, said slide and body being graduated in identical logarithmic scales of the same modulus, said slide rule being also graduated in at least one reciprocal logarithmic scale, said slide being graduated in scale graduations of the same modulus to give readings of angles the values of the sine functions of which can be found by reference to the logarithmic scale on the slide when the indices thereof are aligned, the indicia of the scale giving readings of angles and the indicia of the logarithmic scale on the slide giving readings of the values of the sine of the angle being of like color, and the indicia of the scale giving readings of angles and the indicia of the logarithmic scale giving readings of the values of the cosine functions being of like color but of a color different from the color of the indicia giving readings of the value of the sine of the angles whereby the treatment of a sine and cosine functions of angles in a problem involving proportions performed by progressive manipulations is indicated by the color relationship.

7. A slide rule comprising a relatively movable slide and body, said slide and body being graduated in identical logarithmic scales of the same modulus, said slide being also graduated in scale graduations of the same modulus to give readings of angles the values of the cosine functions of which can be found by reference to the logarithmic scale on the slide when the indices thereof are aligned, the indicia of the scale giving readings of angles and the indicia of the logarithmic scale on the slide giving readings of the value of the cosine function of such angles being of unlike colors whereby the treatment of a cosine function of angles in a problem involving proportions performed by progressive manipulations is indicated by the color relationship.

8. A slide rule comprising a relatively movable slide and body, an inverted logarithmic scale on the slide and an inverted logarithmic scale on the body of the same modulus, said slide being also graduated in scale graduations of the same modulus to give readings of angles the values of the secant functions of which can be found by reference to the inverted logarithmic scale on the slide when the indices thereof are aligned, said slide being also graduated in scale graduations of the same modulus to give readings of angles the values of the cosecant functions of which can be found by reference to the inverted logarithmic scale on the slide, the indicia of the scale giving readings of angles and the indicia of the inverted logarithmic scales giving readings of the value of the secant functions being of like colors, and the indicia of the scale giving readings of angles being of a color unlike that of the inverted scale giving readings of the value of the cosecant functions whereby the treatment of secant and cosecant functions of angles in a problem involving proportions performed by progressive manipulations is indicated by the color relationship.

9. A slide rule comprising a relatively movable slide and body, an inverted logarithmic scale on the slide and a logarithmic scale on the body of the same modulus, said slide being graduated in scale graduations of the same modulus to give readings of angles the values of the cosecant functions of which can be found by reference to the inverted logarithmic scale on the slide when the indices thereof are aligned, the indicia of the scale giving readings of angles being of a color unlike the indicia of the inverted scale giving readings of the values of the cosecant whereby the treatment of a cosecant function of an angle in a problem involving proportions performed by progressive manipulations is indicated by the color relationship.

10. A slide rule comprising a relatively movable slide and body, said slide and body being graduated in identical logarithmic scales of the same modulus, said slide being graduated in scale graduations of the same modulus as said logarithmic scales to give readings of angles the values of the cotangential functions of which, above forty-five degrees, can be found by reference to the logarithmic scale on the slide when the indices thereof are aligned, the indicia of the scale giving readings of angles and the indicia of the logarithmic scale on the slide giving readings of the values thereof being of unlike colors whereby the treatment of a co-tangent function of angles above forty-five degrees in a problem involving proportions performed by progressive manipulation is indicated by the color relationship.

11. A slide rule comprising a relatively movable slide and body, an inverted logarithmic scale on the slide and a logarithmic scale on the body of the same modulus, said slide being graduated in scale graduations of the same modulus as the inverted logarithmic scale to give readings of angles the values of the co-tangential functions of which, up to forty-five degrees, can be found by reference to the inverted logarithmic scale on the slide when the indices thereof are aligned, the indicia of the scale giving readings of angles and the indicia of the inverted logarithmic scale on the slide giving readings of values being of unlike colors whereby the treatment of a co-tangential function of angles up to forty-five degrees in a problem involving proportions performed by progressive manipulation is indicated by the color relationship.

12. A slide rule comprising two relatively movable members, logarithmic scales of the same modulus on the respective members, one of said members being graduated in scale graduations of the same modulus as the logarithmic scales to give readings of angles the values of the trigonometric functions of which are found by reference to said logarithmic scales when the indices thereof are aligned, the indicia of the scale graduations of the logarithmic scale giving readings of the values of the direct functions of angles being of the same color as those indicia of the scale graduations giving the readings of the angles and the indicia of the scale graduations of the logarithmic scales giving readings of the values of the co-functions of angles being of a different color from the indicia of those scale graduations giving the readings of the angles.

13. A slide rule comprising two relatively movable members, logarithmic scale graduations on one of said members, index means on the other member, said member being also graduated in scale graduations of the same modulus as the logarithmic scale graduations to give readings of angles the values of the trigonometric functions of which are found by reference to said logarithmic scale graduations when the indices thereof are aligned, the indicia of the logarithmic scale graduations giving readings of the values of the direct functions of angles being of the same color as those indicia of the scale graduations giving the readings of the angles and the indicia of the logarithmic scale graduations giving readings of the values of the co-functions of angles being of a different color from the indicia of those scale graduations giving the readings of the angles.

14. A slide rule comprising two relatively movable members, logarithmic scales of the same modulus on one of said members, index means on the other member, said member being also graduated in scale graduations of the same modulus as the logarithmic scales to give readings of angles the values of the trigonometric functions of which are found by reference to said logarithmic scales when the indices thereof are aligned, the indicia of the scale graduations of the logarithmic scale giving readings of the values of the direct functions of angles being of the same color as those indicia of the scale graduations giving the readings of the angles and the indicia of the scale graduations of the logarithmic scales giving readings of the values of the co-functions of angles being of a different color from the indicia of those scale graduations giving the readings of the angles.

15. A slide rule comprising two relatively movable members, at least one logarithmic scale on one member, the other of said members being graduated in scale graduations of the same modulus as the logarithmic scale to give readings of angles the values of the trigonometric functions of which are found by reference to said logarithmic scale when the indices thereof are aligned and the indicia of the scale graduations of the logarithmic scale giving readings of the values of the co-functions of angles being of a different color from the indicia of those scale graduations giving the readings of the angles.

16. A slide rule comprising two relatively movable members, logarithmic scales of the same modulus on the respective members, an inverted logarithmic scale of the same modulus on the respective members, one of said members being graduated in scale graduations of the same modulus as the logarithmic scales to give readings of angles the values of the trigonometric functions of which are found by reference to said logarithmic scales when the indices thereof are aligned, the indicia of the scale graduations of the logarithmic scales giving readings of the values of the direct functions of angles being of the same color as those indicia of the scale graduations giving the readings of the angles and the indicia of the scale graduations of the inverted logarithmic scales giving readings of the values of the co-functions of angles being of a different color from the indicia of those scale graduations giving the readings of the angles.

17. A slide rule comprising two relatively movable members, a logarithmic scale on at least one of the members, an inverted logarithmic scale on at least one of the members, one of said members being graduated in scale graduations of the same modulus as the logarithmic scales to give readings of angles the values of the trigonometric functions of which are found by reference to said logarithmic scales when the indices thereof are aligned, the indicia of the scale graduations of the logarithmic scale giving readings of the values of the sine, tangent and secant being of the same color as the respective indicia of the scale graduations giving the readings of the angles and the indicia of the scale graduations of the logarithmic scales giving readings of the values of the cosine, cotangent and cosecant of angles being of a different color from the color of the indicia of the respective scale graduations giving the readings of the angles.

18. A slide rule comprising two relatively movable members, logarithmic scales of the same unit length on the respective members, one of said members being graduated in scale graduations of the same modulus as the logarithmic scales to give readings of angles the values of the tangents of which are found by reference to said logarithmic scales when the indices are aligned, the indicia of the scale graduations on the logarithmic scale giving readings of the values of the tangents of predetermined angles being of the same color as those indicia of the scale graduations giving the readings of the value of the angles and the indicia of the scale graduations on the logarithmic scales giving readings of the cotangents of other predetermined angles being of a different color than the color of the indicia of those scale graduations giving the readings of the angles.

19. A slide rule comprising two relatively movable members, logarithmic scales of the same unit length on the respective members, one of said members being graduated in scale graduations of the same modulus as the logarithmic scales to give readings of angles the values of the trigonometric functions of which are found by reference to said logarithmic scales when the indices thereof are aligned, the scale graduations of the logarithmic scale giving readings of the values of the direct functions of angles having the same distinguishing characteristic as the distinguishing characteristic of the scale graduations giving the readings of the angles and the scale graduations of the logarithmic scales giving readings of the values of the co-functions of angles having a different distinguishing characteristic from the distinguishing characteristc of those scale graduatons giving the readings of the angles.

20. A slide rule comprising two relatively movable members, logarithmic scales of the same unit length on the respective members, one of said members being graduated in scale graduations of the same modulus as the logarithmic scales to give readings of angles the values of the trigonometric functions of which are found by reference to said logarithmic scales when the indices thereof are aligned the scale graduations of the logarithmic scales giving readings of the values of the co-functions of angles having a different distinguishing characteristic from the distinguishing characteristic of those scale graduations giving the readings of the angles.

LYMAN M. KELLS.
WILLIS F. KERN.
JAMES R. BLAND.

CERTIFICATE OF CORRECTION.

Patent No. 2,285,722. June 9, 1942.

LYMAN M. KELLS, ET AL.

It is hereby certified that error appears in the printed specification of the above numbered patent requiring correction as follows: Page 1, second column, line 24, for "Bernegan" read --Bernegau--; page 2, first column, line 44, for "ot" read --to--; and second column, line 39, after "base" insert --of--; page 5, second column, lines 61 and 62, claim 5, strike out "up to forty-five degrees" and insert the same after "angles" and before the comma in line 60, same claim; page 6, first column, line 11-12, claim 6, for "manipulations" read --manipulation--; lines 45 and 48, claim 8, for "value" read --values--; page 7, second column, line 42, claim 19, for "characteristc" read --characteristic--; and that the said Letters Patent should be read with this correction therein that the same may conform to the record of the case in the Patent Office.

Signed and sealed this 8th day of September, A. D. 1942.

(Seal)

Henry Van Arsdale,
Acting Commissioner of Patents.